(12) United States Patent
Kanevsky et al.

(10) Patent No.: US 6,529,902 B1
(45) Date of Patent: Mar. 4, 2003

(54) METHOD AND SYSTEM FOR OFF-LINE DETECTION OF TEXTUAL TOPICAL CHANGES AND TOPIC IDENTIFICATION VIA LIKELIHOOD BASED METHODS FOR IMPROVED LANGUAGE MODELING

(75) Inventors: Dimitri Kanevsky, Ossining, NY (US); Emmanuel Yashchm, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,995

(22) Filed: Nov. 8, 1999

(51) Int. Cl.$^7$ .............................. G06F 17/30; G06F 7/00
(52) U.S. Cl. .............................. 707/5; 707/10; 707/531; 704/9
(58) Field of Search .................................. 707/1–5, 531; 704/9, 248–249, 253, 257

(56) References Cited

U.S. PATENT DOCUMENTS

| | | | | |
|---|---|---|---|---|
| 5,418,951 A | * | 5/1995 | Damashek ...................... | 707/5 |
| 5,806,021 A | * | 9/1998 | Chen et al. ..................... | 704/9 |
| 5,839,106 A | * | 11/1998 | Bellegarda .................. | 704/257 |
| 6,052,657 A | * | 4/2000 | Yamron et al. ................. | 704/9 |
| 6,104,989 A | * | 8/2000 | Kanevsky et al. ............. | 704/9 |

OTHER PUBLICATIONS

Fiscus, J. et al. "NIST's 1998 Topic Detection and Tracking Evaluation (TDT–2)", Proceedings of the DARPA Broadcast News Workshop, Feb. 28–Mar. 3, 1999.*

Allen, J. et al. "Topic Detection and Tracking Pilot Study Final Report", Proceedings of the DARPA Broadcast News Transcription and Understanding Workshop, Feb. 1998.*

Wayne, C.L. "Topic Detection and Tracking (TDT): Overview and Perpective", TDT1, University of Maryland, 1997. Downloaded from www.nist.gov/speech/publications/darpa98/pdf/tdt10.pdf on Nov. 14, 2001.* van Mulbregt, P. et al. "Segmentation of Automatically Transcribed Broadcast News Text", Proceedings of the DARPA Broadcast News Workshop, Feb. 28–Mar. 3 1999.*

Dharanipragada, S. et al. "Story Segmentation and Topic Detection in the Broadcast News Domain", Proceedings of the DARPA Broadcast News Workshop, Feb. 28–Mar. 3, 1999.*

Stolcke, A. et al. "Combining Words and Speech Prosody for Automatic Topic Segmentation", Proceedings of the DARPA Broadcast News Workshop, Feb. 28–Mar. 3, 1999.*

Cieri, C. et al. "The TDT–2 Text and Speech Corpus", Proceedings of the DARPA Broadcast News Workshop, Feb. 28–Mar. 3, 1999.*

(List continued on next page.)

Primary Examiner—Jean R. Homere
Assistant Examiner—Luke S Wassum
(74) Attorney, Agent, or Firm—Stephen C Kaufman, Esq; McGinn & Gibb, PLLC

(57) ABSTRACT

A system (and method) for off-line detection of textual topical changes includes at least one central processing unit (CPU), at least one memory coupled to the at least one CPU, a network connectable to the at least one CPU, and a database, stored on the at least one memory, containing a plurality of textual data set of topics. The CPU executes first and second processes in first and second directions, respectively, for extracting a segment having a predetermined size from a text, computing likelihood scores of a text in the segment for each topic, computing likelihood ratios, comparing them to a threshold, and defining whether there is a change point at the current last word in a window.

53 Claims, 8 Drawing Sheets

OTHER PUBLICATIONS

Ponceleon, D. and Srinivasan, S. "Automatic Discovery of Salient Segments in Imperfect Speech Transcripts", Proceedings of the 10$^{th}$ International Conference on Information and Knowledge Management (CIKM –01), Nov. 5–10, 2001, pp. 490–497.*

Allan, J. et al. "Topic Detection and Tracking Pilot Final Report", Proceedings of the DARPA Broadcast News Transcription and Understanding Workshop, Feb. 1998, 25 pages.*

Chen, et al., "Speaker, Environment and Channel Change Detection and Clustering via the Bayesian Information Criterion", Proceedings of the Speech Recognition Workshop, 1998.

Yamron, J., "Topic Detection and Tracking Segmentation Task", Proceedings of the Topic Detection and Tracking Workshop, University of Maryland, Oct. 1997.

DARPA Broadcast News Transcription and Understanding Workshop, Feb. 8–11, 1998.

Yashchin, E., "Likelihood Ration Methods for Monitoring Parameters of a Nested Random Effect Model", Journal of the American Statistical Association, Jun. 1995, pp. 729–738.

* cited by examiner

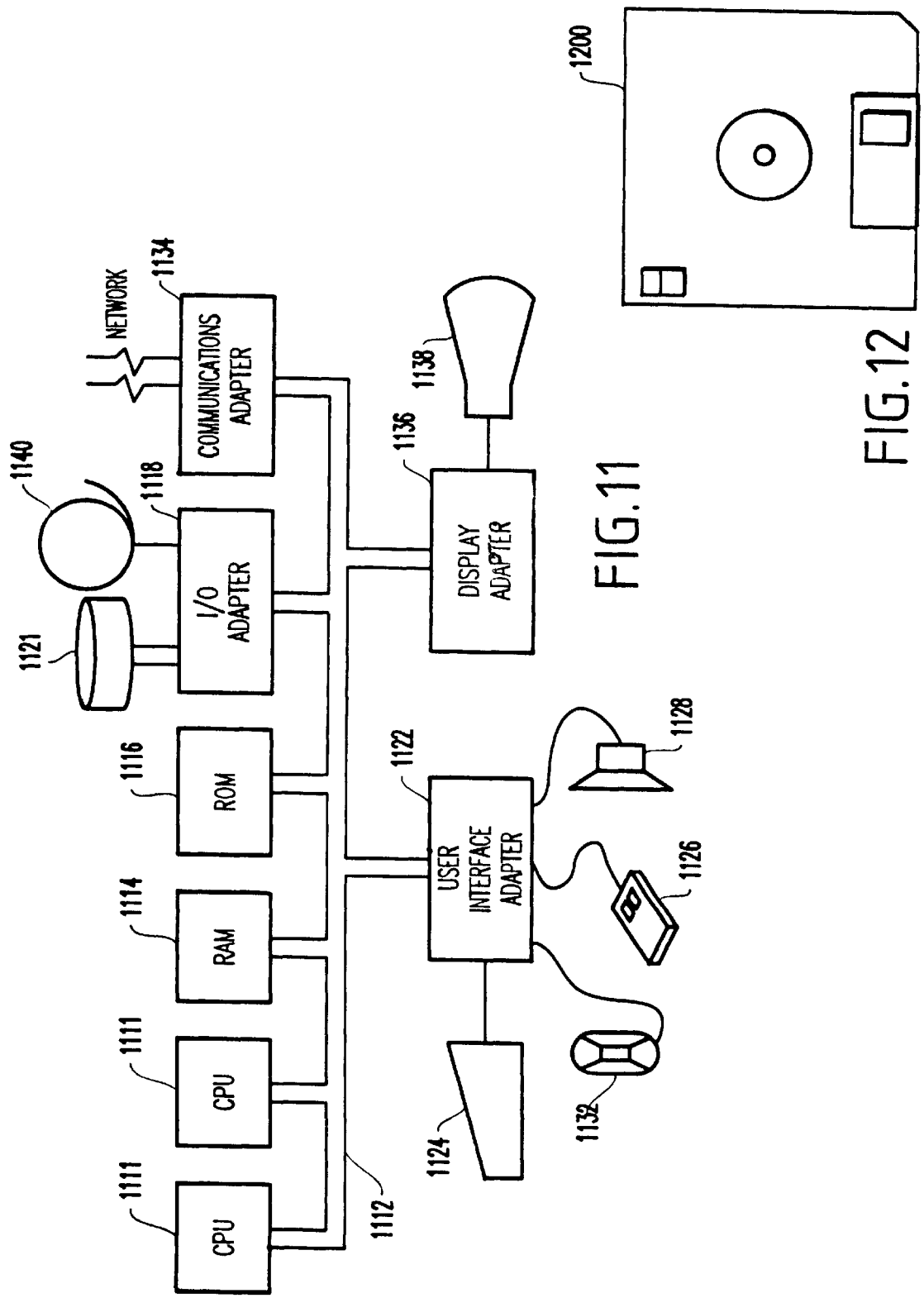

METHOD AND SYSTEM FOR OFF-LINE DETECTION OF TEXTUAL TOPICAL CHANGES AND TOPIC IDENTIFICATION VIA LIKELIHOOD BASED METHODS FOR IMPROVED LANGUAGE MODELING

BACKGROUND OF THE INVENTION

1. Field of the Invention

The present invention generally relates to off-time topic (e.g., off-line) detection, and more particularly to the problem of off-line detecting topical changes and topic identification in texts for use in such practical applications as improving automatic speech recognition and machine translation.

2. Description of the Related Art

Conventional methods exist for the above-mentioned topic identification problem. However, hitherto the present invention, no suitable method has been employed even though such can be useful in various off-line tasks such as textual data mining, automatic speech recognition, machine translation, etc. This problem requires solution of a segmentation task that present independent interest.

There exist some methods for dealing with the problem of text segmentation. In general, the conventional approaches fall into two classes:

1) Content-based methods, which look at topical information such as n-grams or IR similarity measures; and
2) Structure or discourse-based methods, which attempt to find features that characterize story opening and closings.

Several approaches on segmentation are described in Jonathan P. Yamron "Topic Detection and Tracking Segmentation Task", *Proceedings of the Topic Detection and Tracking Workshop,* University of Maryland, October 1997. This paper describes a content-based approach that exploits the analogy to speech recognition, allowing segmentation to be treated as a Hidden Markov Model (HMM) process.

More precisely, in this approach the following concepts are used: 1) stories are interpreted as instances of hidden underlying topics; 2) the text stream is modeled as a sequence of these topics, in the same way that an acoustic stream is modeled as a sequence of words or phonemes; and 3) topics are modeled as simple unigram distributions.

There exist several approaches for topic detection that have been described in a workshop (e.g., see DARPA, *Broadcast News Translation and Understanding Workshop,* Feb. 8–11, 1998). Some of them (e.g., "Japanese Broadcast News Transcription and Topic Detection", Furui, et al., in DARPA, *Broadcast News Translation and Understanding Workshop,* Feb. 8–11, 1998) require all words in an article to be presented in order to identify a topic of the article. A typical approach for topic identification is to use key words for a topic and count frequencies of key words to identify a topic (see for example "Japanese Broadcast News Transcription and Topic Detection", Furui, et al., in DARPA, *Broadcast News Translation and Understanding Workshop,* Feb. 8–11, 1998).

Recently, a method for realtime topic detection that is based on likelihood ratio was described in "Real time detection of textual topical changes and topic identification via likelihood based methods", Kanevsky, et al., commonly-assigned U.S. patent application Ser. No. 09/124,075, filed on Jul. 29, 1998 incorporated herein by reference.

However, the above-mentioned methods have not been very successful in detection of the topical changes present in the data.

For example, model-based segmentation and the metric-based segmentation rely on thresholding of measurements which lack stability and robustness. Besides, the model-based segmentation does not generalize to unseen textual features. Concerning textual segmentation via hierarchical clustering, this approach is problematic in that it is often difficult to determine the number of clusters of words to be used in the initial phase.

All of these methods lead to a relatively high segmentation error rate and, as consequence, lead to a confusing/confusable topic labeling. There are no descriptions of how confusability in topic identification could be resolved when topic labelling is needed for such application tasks as text mining, or for improving a language model in off-line automatic speech recognition decoding or machine translation.

Concerning known topical identification methods, one of their deficiencies is that they are not suitable for realtime tasks since they require all data to be presented.

Another deficiency is their reliance on several key words for topic detection. This makes realtime topic detection difficult since key words are not necessarily present at the onset of the topic. Thus, the sample must be processed to near its conclusion before a topic detection is made possible.

Yet another problem with "key words" is that a different topic affects not only the frequencies of key words but also the frequencies of other (non-key) words. Exclusive use of key words does not allow one to measure the contribution of other words in topic detection.

Concerning "cumulative sum" (CUSUM)-based methods that are described in the above-mentioned U.S. patent application Ser. No. 09/124,075, since these methods are realtime-based they use a relatively short segments to produce probabilities scores to establish changes in a likelihood ratio. These methods also must use various stopping criteria in order to abandon a current line of segmentations and identification. This also can lead to detecting topic changes too late or too early.

Another problem with existing methods is that they tend to be extremely computing-intensive, resulting in an extremely high burden on the supporting hardware.

SUMMARY OF THE INVENTION

In view of the foregoing and other problems, disadvantages, and drawbacks of the conventional methods, an object of this invention is to provide an off-line segmentation of textual data that uses change-point methods.

Another object of the present invention is to perform off-line topic identification of textual data.

Yet another object of the present invention is to provide an improved language modeling for off-line automatic speech decoding and machine translation.

In a first aspect of the invention, a system (and method) for off-line detection of textual topical changes includes at least one central processing unit (CPU), at least one memory coupled to the at least one CPU, a network connectable to the at least one CPU, and a database, stored on the at least one memory, containing a plurality of textual data set of topics. The CPU executes first and second processes in forward and reverse directions, respectively, for extracting a segment having a predetermined size from a text, computing likelihood scores of a text in the segment for each topic, computing likelihood ratios, comparing them to a threshold, and defining whether to declare a change point at the current last word in the window.

In a second aspect, a method of detecting topical changes in a textual segment, includes evaluating text probabilities under each topic of a plurality of topics, and selecting a new topic when one of the text probabilities becomes larger than others of the text probabilities, wherein the topic detection is performed off-line.

In a third aspect, a storage medium is provided storing the inventive method.

The present invention solves the problem of detecting topical changes via application of "cumulative sum" (CUSUM)-based methods. The basic idea of the topic identification procedure is to evaluate text probabilities under each topic, and then to select a new topic when one of those probabilities becomes significantly larger than the others.

Since the topic detection is performed off-line, the inventive method can be enhanced by producing several different topic labels using different labeling strategies. One of such labeling strategies is to mark topics moving from an end of a text to a beginning. The special topic labeling is then chosen via evaluation of several evidences and factors that lead to different topic labeling. This special topic labeling can be applied to produce new topic scores that are needed for improving a language model in off-line automatic speech recognition decoding or machine translation.

Thus, the present invention can perform off-time topic detection by performing several steps. That is, the steps include segmentation of textual data into "homogenous" segments and topic (event) identification of a current segment using different time directions (e.g., moving from a beginning of a text to the end of it and vice versa), and estimating probability scores for topics using marks that were obtained via these different labeling procedures.

More specifically, the invention uses CUSUM-based methods for detecting change-points in textual data and estimating probabilities of sample distribution for topic identification.

Hence, the basic approach of the invention is to apply change-point detection methods for detection of "homogenous" segments of textual data while moving in two different "time" directions: from a beginning of a text to an end and vice versa. This enables identifying "hidden" regularities of textual components that are obtained for each "time" direction. If these regularities coincide for both directions, then they are used for topic labeling. Otherwise, they are used to build a mathematical model that reflect confusability in these regularities.

Hereinbelow is described how labelling is performed for each of a plurality (e.g., two) of directions. Then, it is described how resolution of confusable decisions that were obtained for different "time" directions is performed.

Generally, a change-point strategy can be implemented using different statistical methods. In the present invention, a change-point method is realized preferably using a CUSUM technique.

With the unique and unobvious features of the present invention, off-line segmentation of textual data that uses change-point methods is employed and off-line topic identification of textual data can be performed, such that topic detection can be achieved rapidly and such that improved language modeling for off-line automatic speech decoding and machine translation results.

Another advantage is that the inventive method is capable of using multi-CPU machines efficiently, (e.g., forward and backward processes can be performed in parallel).

BRIEF DESCRIPTION OF THE DRAWINGS

The foregoing and other objects, aspects and advantages will be better understood from the following detailed description of a preferred embodiment of the invention with reference to the drawings, in which:

FIG. 11 illustrates a block diagram of the environment and configuration of a system 1100 for implementing the method according to the present invention; and FIG. 12 illustrates a storage medium 1200 for storing steps of the program according to the present invention.

DETAILED DESCRIPTION OF PREFERRED EMBODIMENTS OF THE PRESENT INVENTION

Figure 1A:
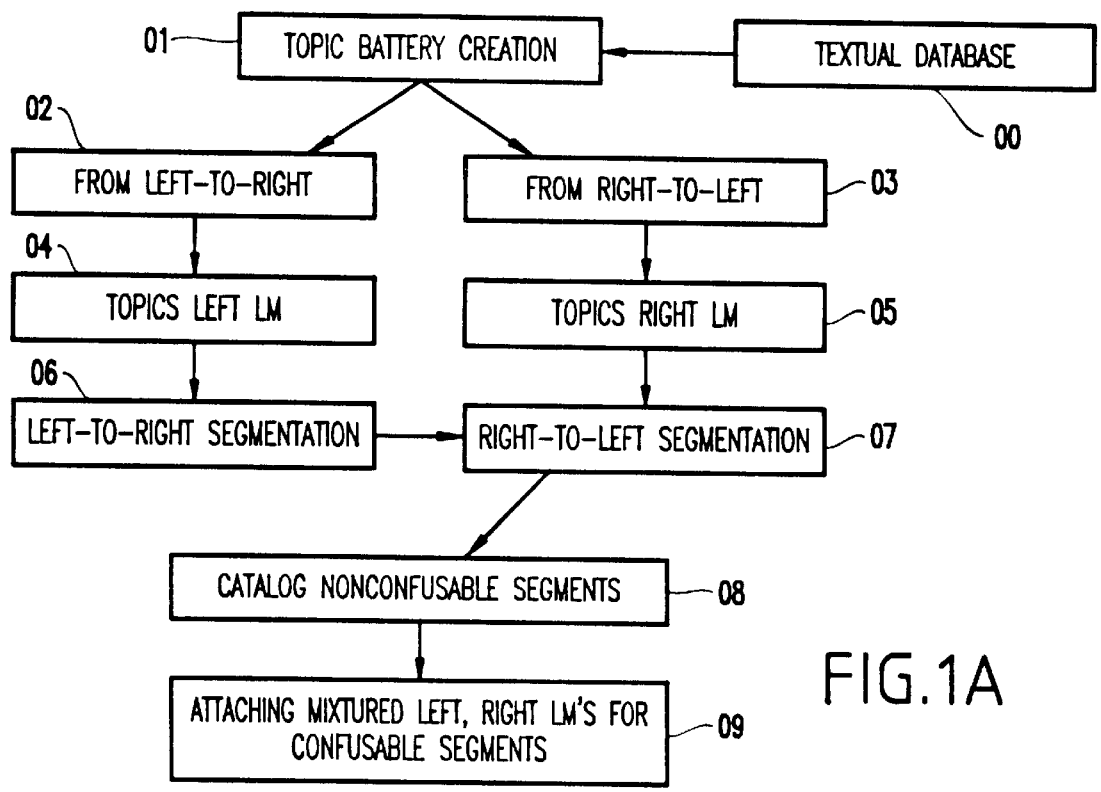
FIG. 1A is a schematic diagram of a flow of a topic identification process.

Referring now to FIGS. 1–12, preferred embodiments of the present invention will be described.

As mentioned above, basically the present invention applies change-point detection methods for detection of "homogenous" segments of textual data while moving in two different "time" directions. For example, such two directions may include from a beginning of a text to an end of the text, and vice versa. This enables identification of "hidden" regularities of textual components that are obtained for each "time" direction. If these regularities coincide for both directions, then they are used for topic labeling. Otherwise, they are used to build mathematical models that reflect confusability in these regularities.

Hereinbelow is described how labelling is performed for each of the directions. Then, it is described how resolution of confusable decisions that were obtained for the different "time" directions is performed.

Generally, a change-point strategy can be implemented using different statistical methods. In the invention, a change-point method is realized using the CUSUM technique. For a general description of CUSUM methods, one can refer to ("Cumulative Sum Charts and Charting for Quality Improvement", Hawkins, et al., *Statistic for Engineering and Physical Science,* 1998; "Weighted Cumulative Sum Technique", Yashchin, Emmanuel, *Technometrics,* 1989, Vol. 31, 321–338; and "Statistical Control Schemes: Methods, Applications, and Generalizations", Yashchin, Emmanuel, *International Statistical Review,* 1993, Vol. 61, No. 1, pp. 41–66).

Application of these methods to detection of topical changes can be described briefly as follows.

One Direction Topic Segmentation and Labeling

Step 1. (Training Procedure)

First, a battery of topics $T_1, T_2, \ldots, T_n$ is created (e.g., an example of a battery of topics created would be "medical", "weather", "legal", etc.).

Every topic is characterized by frequencies of tokens, frequencies of combination of two (2) words, three (3) words etc. It is assumed that the Kulback-Liebler distance between any two topics is at least h, where h is some sufficiently large threshold. Probabilities of a tuple of words depend on time directions. In other words, for each time direction, separate probabilities for a combination(s) of words should be estimated. This can lead to different Kulback-Liebler distances between two different topics (e.g., depending on "time" directions).

Then, a "neutral" topic $\tilde{T}$ is created that is derived from textual data that include all topics and other general texts (e.g., from an encyclopedia). The topic in a text segment will be considered "neutral" if it cannot be reliably associated with any of the topics in the battery. $\tilde{T}$ will be handy when topics fail to be established because of their short life and as a result end up with a mixture of topics. $\tilde{T}$ provides an instrument to re-start the process.

Then, typical durations are found of texts belonging to topics in the battery (for possible applications tasks, e.g. broadcasting news or lectures). This information will be needed later in order to set limits in topic identification methods, as described below. These typical durations of texts are direction dependent and should be established separately for each direction.

Hereinbelow, for simplicity, a "time" direction will be used from a beginning of a text to an end (e.g., word indexes increase in this direction). However, an opposite direction can be described exactly in the same way (e.g., using decreasing indexes of words in strings).

Step 2 (Begin Process n the Direction from Beginning of a Text to an End).

In this step, estimated frequencies are examined and are compared to all topics in the list. As soon as a single topic emerges as a strong "winner" (e.g., the "winner" is determined based on frequency of some characteristic words, as described below), this topic will be declared. If a conclusion is reached that a current topic is not in the list, then $\tilde{T}$ will be declared as a "current topic". The topic should not be established too early (e.g., to avoid topic misidentification because of insufficient data). In some practical applications, efforts should be made to identify a topic long before its end. For example, in realtime machine translation, a correct topic information is needed to improve translation, and therefore a topic identification is needed before reaching the end of the topic to be useful.

Step 3. (Monitoring)

Once a topic $\hat{T}$ has been declared, a monitoring process is commenced to detect a change (e.g., a change in topic).

In this process, the likelihood of text is compared against $\hat{T}$ (e.g., by looking backward) until a regeneration point is reached or until a signal is triggered. A regeneration point is defined as a "stopping" point beyond which there is no need to continue backward tests, since no new data for a topic change would be considered relevant. An efficient procedure for defining a "stopping" point via definition of a regeneration point is implemented in the present invention (following a general concept that is described in "Likelihood Ratio Methods for Monitoring Parameters of a Nested Random Effect Model", Yashchin, Emmanuel, *Journal of the American Statistical Association,* June 1995, Vol. 90, no. 430, Theory and Methods, pp. 729–737).

Step 4. (Establish a Current Topic)

Once the topic change is detected, the time of onset of the new topic is established. However, because there is too little information at this point to establish the new topic definitively, the new topic should not be declared yet. Instead, the inventive process continues accumulating words until a clear "winner" emerges. This procedure includes the following steps.

First, a candidate topic $T_i$ is found for which the likelihood of the text is maximal (e.g., the probability of observed text is computed for various topics, and the one for which this probability is maximal is selected).

Then, the closest competing topic (i.e., a topic that has the maximum of likelihoods corresponding to remaining topics excluding $(\tilde{T})$) is found.

Then, a comparison is performed between a likelihood of the group of words in the candidate topic $T_i$ against $\{T_1, \ldots \}$. If this likelihood is higher by a given factor (e.g., threshold) than likelihood of a text to the closest competing topic, then $T_i$ is declared as the current topic.

If a conclusion is reached that a topic is not in the list, then $\tilde{T}$ is declared as the current topic.

Step 5. (Restart Monitoring Current Topic)

After a new topic has been declared, the monitoring procedure is restarted to detect a change (i.e., return to step 3).

Detection of an Onset of a New Topic

Before introducing a monitoring procedure, some notations will be provided. Let $P(w_l, w_{l+1}, \ldots w_r|T_i)$ represent some likelihood measure for "seeing" a given string of words $w_l, w_{l-1}, \ldots w_r$ in a context of a topic $T_i$ from the battery. Let $$F_i(w_l, w_{l+1}, \ldots w_r) = \max_{\{j=1 \ldots n,\ T_j \neq T_i;\ T_j \neq \tilde{T}\}} P(w_l \ldots w_r|T_j) \quad (1)$$

Suppose that moment of time 1 corresponds to a regeneration point and that words from $w_l$ to $w_m$ have already been analyzed and no evidence has been found that the declared topic $T_i$ changed.

Now, a check is made to determine whether the next word $w_{m-1}$ belongs to the same topic or whether the topic has changed. The procedure for this verification includes the following steps.

First, take a segment of length 1.

That is, is $$\frac{F_i(w_{m+1})}{P(w_{m+1}|T_i)} > c$$

If "YES", then it is declared that topic is not $T_i$, and m+1 is also declared as the onset point of a new topic.

If "NO", then take a segment of length 2.

That is, is $$\frac{F_i(w_m, w_{m+1})}{P(w_m, w_{m+1}|T_i)} > c$$

If "YES", then declare that topic is not $T_i$, and also declare m as the onset point of a new topic.

If "NO", then a segment of length 3 is taken.

That is, is $$\frac{F_i(w_{m-1}, w_m, w_{m+1})}{P(w_{m-1}, w_m, w_{m+1}|T_i)} > c?$$

Then, it is determined whether a segment (e.g., going back in time until the regeneration point) was found for which:

$$\frac{F_i(w_{m+2-k} \ldots w_{m-1}, w_m, w_{m+1})}{P(w_{m+2-k} \ldots w_{m-1}, w_m, w_{m+1}|T_i)} > c? \quad (2)$$

If "YES", then it is declared that the topic is not $T_i$, and m−k+2 is declared as the onset point of a new topic. If "NO", then declare that there is no evidence of change of topic.

If l is reached (i.e., all values k=1, 2, . . . l are examined) and in all the previous steps, including a regeneration point $$\frac{F_i(w_{m+2-k} \ldots w_{m-1}, w_m, w_{m+1})}{P(w_{m+2-k} \ldots w_{m-1}, w_m, w_{m+1}|T_i)} < 1 \quad (3)$$

then declare $w_{m+1}$ as a new regeneration point.

A thresholding value c in the above formulas depends on a chosen trade-off between a rate of false alarms and sensitivity. This thresholding value c can be estimated theoretically or from trial experiments. This thresholding value c also depends on a time direction via which a textual corpus is estimated.

Using known link grammars methods (e.g., see "Grammar Trigrams: A Probabilistic Model of Link Grammar", Lafferty, et al., presented to the 1992 *AAAI Fall Symposium on Probabilistic Approaches to Natural Language*), one can provide examples when a current word detects a link with a word that is located "remotely" (e.g., far away from the current word position; that is, the distance is measured in the number of words in between the two words of interest). This can be used to measure contribution of "remote" words in likelihood ratios 2.

An explicit representation of an expression $P(w_{m-k+2} \ldots w_{m-1}, w_m, w_{m+1}|T_i)$ depends on chosen parametrical models for probability distributions or estimation of probabilities from a training data.

If these probabilities can be split into multiplicative factors (e.g., depending on composition of textual data into components-words or phrases), then a simplified expression for ratio of probabilities can be obtained. If there is a very large number of topics, one can use parallel processing to compute a maximum score in Equation (1). One can also use the following version of monitoring procedure that does not require computation of maximum scores at each step.

Modification to the Above-Described Detection of Onset of New Topic

In the notations of the above previous sections, let a topic $T_j$ be declared and its onset time be found. Then, a new word is taken. Then set k=1 and, starting from a current word $w_{m-1}$, go k words back and find probabilities $P_{m+1-i}^{(T_j)} = P(w_{m+1-i}|T_j)$, i=0,1, . . . , k−1. Also construct the distribution $\{\hat{P}_{m-k+2}, \ldots \hat{P}_{m+1}\}$ where $$\hat{P}_i = \frac{\text{\# of times word } i \text{ appeared in the current segment of size } k}{k}.$$

Now construct the sum:

$$S_k = \sum_{i=0}^{k-1} \ln \frac{\hat{P}_{m-i+1}}{P_{m-i+1}^{(T_j)}} \quad (4)$$

If $S_k>c$, then declare that a change in topic occurred and declare m−k+2 as the onset point. If not, then increase k by 1 and repeat the process. If the regeneration point is reached and $S_k>c$ is not evident, then continue with the current topic $T_j$. If for the present point $S_k<0$ for every k, then declare the present point a new regeneration point.

It is noted that if parameter c is chosen too high, then there is a risk that a topic change is detected too late. If c is chosen too low, then the risk of making a false statement that a change in topic has occurred is increased.

Topic Identification

The topic identification of a given text segment $w_l, \ldots, w_{m+1}$ includes two steps. The first step is a verification of whether this segment is covered by a new topic that is not in the battery of topics.

If it was found that the segment is covered by some topic from the battery, then this topic is identified in the second step.

Hereinbelow, a mathematical description of this procedure is given for two different implementations.

Phase 1: Test if topic is in the battery.

For a given k corresponding to the segment associated with the current topic, compute for every j in the battery of topics $$S(j) = \sum_{i=0}^{k-1} \ln \frac{\hat{P}_{m-i+1}}{P_{m-i+1}^{(T_j)}} \quad (5)$$

If $S(j)>c$ for all j, then declare that the topic is not in the battery and switch to the neutral topic $\tilde{T}$. Data from new topics can be collected and stored for later off-line processing to include new topics into the battery.

Phase 2: Establish the topic.

a) Long regime implementation (economical).

If $$\frac{P(w_{m-k+2} \ldots w_{m+1}|T_i)}{\max_{j \neq i} P(w_{m-k+2} \ldots w_{m+1}|T_j)} > c_1 \quad (6)$$

for some i, then declare $T_i$ as a new topic.

b) Robust implementation.

Though m−k+2 was declared as the onset point of the new regime, intermediate segments are still checked. Thus, if $$\frac{P(w_l \ldots w_{m+1}|T_i)}{\max_{j \neq i} P(w_l \ldots w_{m+1}|T_j)} > c_1 \quad (7)$$

for some i and l=m+1, m, . . . , m−k+2, then declare $T_i$ as a new topic.

If it was neither established that topic is not in the battery nor was the topic identified, an additional point (increase m by 1) is taken and a return to Phase 1 is performed. Eventually, a value of m will be found for which the topic can be identified or the topic can be declared as not being in the battery. If the end of data is reached and no conclusion about current segment is achieved, label it as $\tilde{T}$.

This completes a topic segmentation and identification in one direction.

Resolving Different Labeling Sets

Hereinbelow, a strategy is described that allows dealing with evidence that was gathered in two different labelling procedures.

First, labels are checked for that were obtained through different time directions. If some labels from different time directions coincide, then segments are created corresponding to these labels. The right boundary of every segment is midway between the right boundaries of the segments corresponding to forward and reverse directions. Similarly, the left boundary of every segment is midway between the left boundaries of segments corresponding to forward and reverse directions. Thus, in the initial phase, segments are created in places where labeling obtained from forward scan agrees with labeling obtained from the reverse scan.

Consider now a situation when one label in one direction $T_j^1$ divides a segment of words between two labels from a different direction $T_{i1}^2$ and $T_{i2}^2$. Assume also that the label $T_j^1$ is different from labels $T_{i1}^2$ and $T_{i2}^2$. In this case, two topic labels are introduced as follows:

1) a label $T_{j,i1}^{1,2}$ for a segment $S_{1,1}$ that is covered by both $T_j^1$ and $T_{i1}^2$; and
2) a label $T_{j,i2}^{1,2}$ for a segment $S_{1,2}$ that is covered by both $T_j^1$ and $T_{i2}^2$. For each of these new labels and a new segment that is covered by the new label, a new set of probabilities is attached that are obtained as an appropriate mixture of old probability sets that are related to old topics.

For example, let $P_a = P(w_k \ldots w_r | T_j^1)$ be a probability for a string of words in the segment $S_{1,1}$, that were labelled by a topic $T_j^1$ and $P_b = P(w_k \ldots w_r | T_i^1)$ be a probability for this string of words that were labelled by a topic $T_i^1$. Then, a new probability is defined for this string of words as a mixture of these probabilities: $P_{ab} = P(w_k \ldots w_r | T_{j,i1}^{1,2}) = \alpha P_a + \beta P_b$. Here, the weight coefficients can be defined as follows: $\alpha = l_1/l$ and $\beta = l_2 l$, where $l_1$ is a duration of a sub-segment $S_{1,1}$, $l_2$ is a duration of a sub-segment $S_{1,2}$ and $l = l_1 + l_2$.

A duration can be proportional to time durations if word strings were obtained as a decoder output from automatic speech recognition (ASR). Alternatively, a duration can be defined by a number of words in a segment or by a sum of expectations of frequencies of words in the corresponding sub-segment.

In general, if a text contains a topic, say, T, then both forward and reverse procedures are expected to identify it as such (provided no error occurs) and produce corresponding segments $T^1$ and $T^2$ for forward and reverse directions. The segment $T^1$ will generally be biased to the right relative to T, and the segment $T^2$ will generally be biased to the left. The reason for this bias is that the information that identifies topic T as such is usually located away from the edges. The forward segmentation will generally assign the "uninformative" left edge of T to the preceding topic (e.g., hence the bias). Similarly, reverse segmentation will assign the uninformative right edge of T to the preceding topic. Averaging the edges of $T^1$ and $T^2$ helps to reduce the bias.

A special case occurs when $T^1$ covers more than one occurrence of $T^2$. This can occur if T contains somewhere a sub-segment that contains words that are unusual for T. Such a sub-segment can be labeled as a new topic by the reverse procedure, but not by forward procedure. The fact that the reverse procedure subsequently returned to the original topic T (and that the forward procedure never detected the sub-segment) indicates that such a sub-segment can be treated as spurious. Therefore, when $T^1$ covers a sub-segment identified by a reverse search, surrounded by $T^2$ on both sides, such a sub-segment is also considered as part of $T^2$, resulting in a longer topic $T^2$. Extraction of the edges of topic by averaging edges of $T^1$ and $T^2$ then proceed as described above.

Before a topic identification procedure on new texts is started, some topical data should be collected from texts with known topics. This training procedure is described below with reference to FIG. 7.

Referring now to FIG. 1A, which illustrates a general two-way direction change point and topic process, modules 01 to 05 illustrate a procedure for creation of topic batteries (e.g., modules 04 and 05) for each direction (e.g., left (02) and right (03)) and forward and reverse language models (e.g., modules 06 and 07)). (In the context of the present application, for example, a forward language model specifies probabilities of coming words given previous text. The reverse model specifies preceding text probabilities given subsequent text.)

This procedure of creation of topic batteries and language models (LMs) is performed once from a textual database 00 based on application of interest (e.g., in segmentation of text containing news, the user could limit himself to topics typically appearing in the news, such as "legal", "medical", "science", etc.). This data is used subsequently for topic segmentation (e.g., module 08) and improved LMs (e.g., that are created as mixtures for confusable states). If some labels from different time directions coincide, then this label is chosen and is placed in the middle of a location of labels from two directions by averaging respective edges, as described above (e.g., module 08). Otherwise, a mixture of LMs is created as described above (module/block 09).

For the confusable segments (e.g., determined as described above), one can create new topics that represent both topics for each direction, as described above. Details for an exemplary one-way procedure are provided in the description of FIGS. 1B–10, etc. below.

Figure 1B:
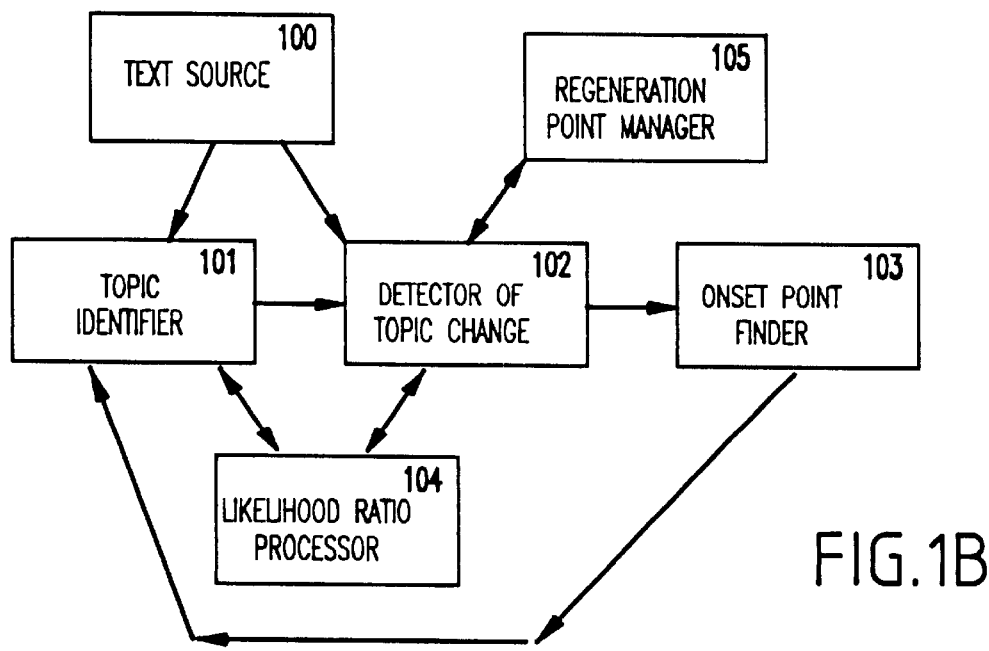
FIG. 1B is a schematic diagram illustrating a process flow of a topic identification process.

Referring now to FIG. 1B, which shows a one-way direction change-point and topic process, the topic identification process 101 according to the present invention starts with the segment of length 1 at the first word in the text source 100. This is the text of interest to be segmented into topics.

This text segment is continuously growing taking new words from the text source 100 until the topic is identified via a likelihood ratio processor 104 (as explained below with reference to FIG. 8).

After the topic is identified, the module 102 (e.g., a detector of topic change) is activated. The topic change may be detected by using likelihood ratio scores (e.g., using a different setting in comparison with a topic identification mode; for example, by using c instead of $c_1$ in likelihood ratio tests as described above. This module is explained hereinbelow with regard to FIG. 6.

When a topic change is detected, an onset of a new topic 103 is also identified (also explained below with reference to FIG. 6). If the topic change for the current segment is not detected, the textual segment grows from text source 100, and the process of detection of the change point 103 is repeated.

The process of change point detection uses some computations of likelihood ratios over data that requires going backward in the text segment until a regeneration point is reached. The regeneration point coincides with the beginning of the text segment unless another regeneration point is found when certain conditions on likelihood ratios in 105 are met (as shown in FIG. 6).

Figure 8:
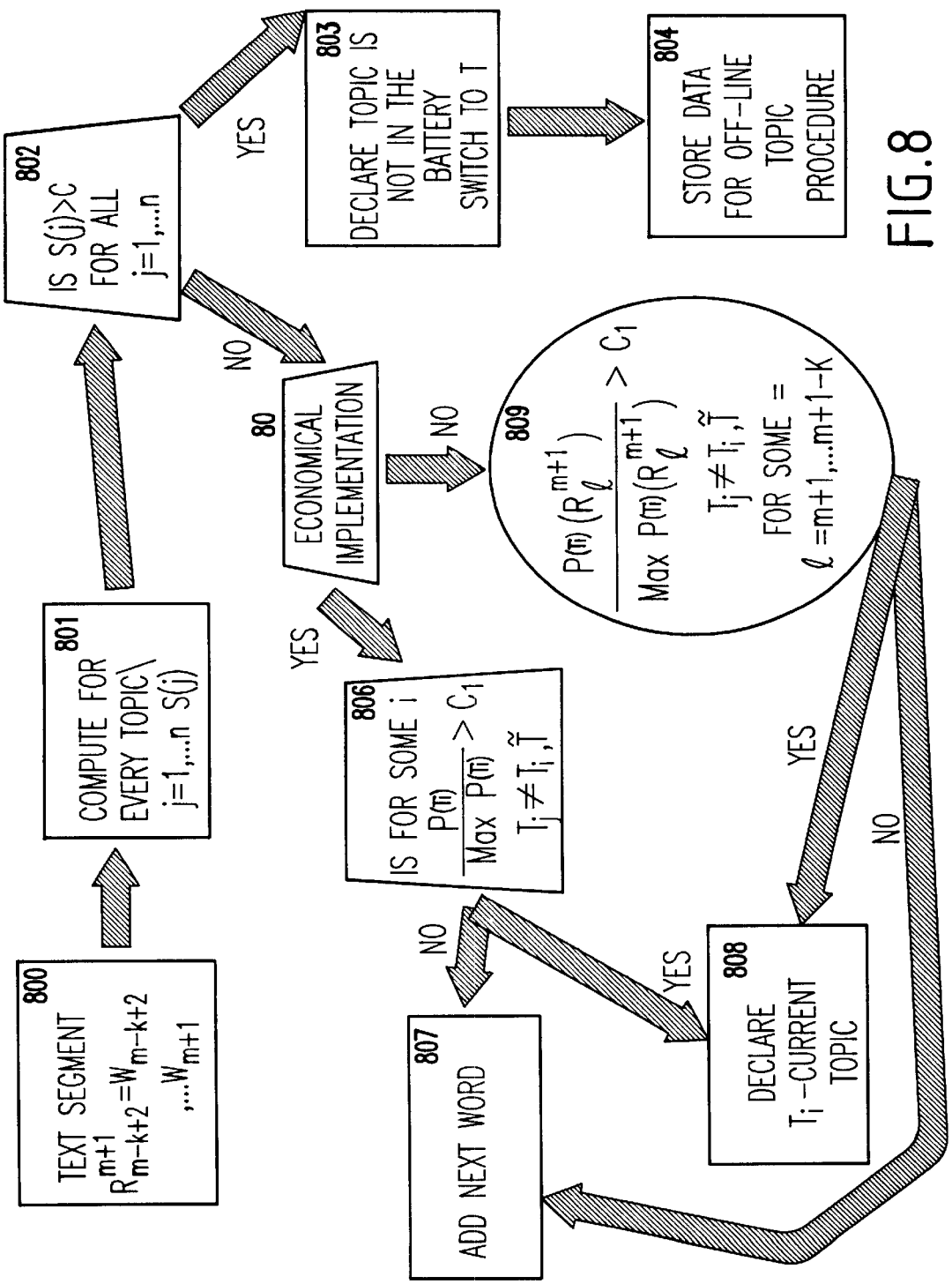
FIG. 8 is a flow chart of an one-way direction process for identification of a topic.

When sufficient evidence on a topic change is obtained in module 102, an onset point of a new topic is computed using an onset point finder 103 using different likelihood ratio criteria in processor 104 (as explained in FIG. 8).

Thereafter, the text segment in text source 100 grows until either a clear topic "winner" emerges, or it is found that a new topic is not in the battery and a neutral topic is declared in the segment by the topic change detector 102 (e.g., until the onset point).

The likelihood ratio processor 104 in FIG. 1B preferably uses probability models given topics. The important class of probability models is considered in FIG. 2 (other probability models can also be used in this setting, as described below with regard to FIG. 3).

Figure 2:
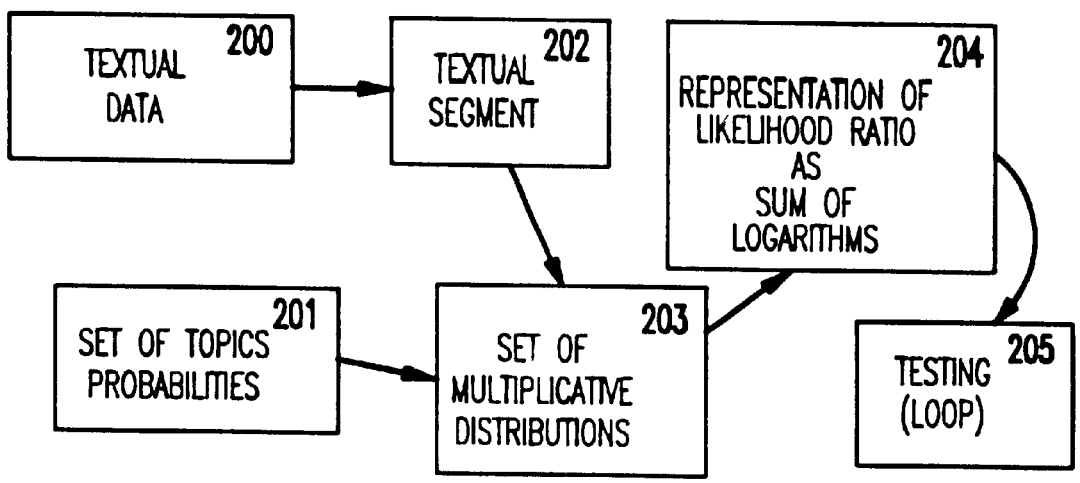
FIG. 2 is a flowchart of an one-way direction process for change-point detection via CUSUM methods in which textual data is modelled by multiplicative distributions.

In FIG. 2, topic probabilities 201 of the segment 202 are represented via the following set of multiplicative distributions 203.

$$P(w_{m+2-k}, w_2 \ldots w_{m+1}|T_i) = \prod_{l=0}^{k-1} P(w_{m+1-l}|T_i) \quad (8)$$

where $P(w_j|T_i)$ denotes a frequency of j-th word estimated from a textual corpus that belongs to a topic $T_i$.

After taking the logarithm of Equation (8), the following sum is obtained:

$$\log P(w_{m-2-k}, w_2 \ldots w_{m-l}|T_i) = \sum_{l=0}^{k-1} \log P(w_{m+1-l}|T_i) \quad (9)$$

Taking the logarithm from the product of Equation (8) in module 204 allows representing the likelihood ratio as a sum of scores similarly as was described at the end of the above-described section entitled "Detection of Onset of a New Topic" and Equation (4).

Representation of likelihood ratios as sums of logarithms makes computations more efficient (e.g., since vector processors can be used) and allows easier estimations of threshold values. The further steps of the testing (loop) algorithm (205) are similar to steps that are described in the process flow of FIG. 1B.

Figure 3:
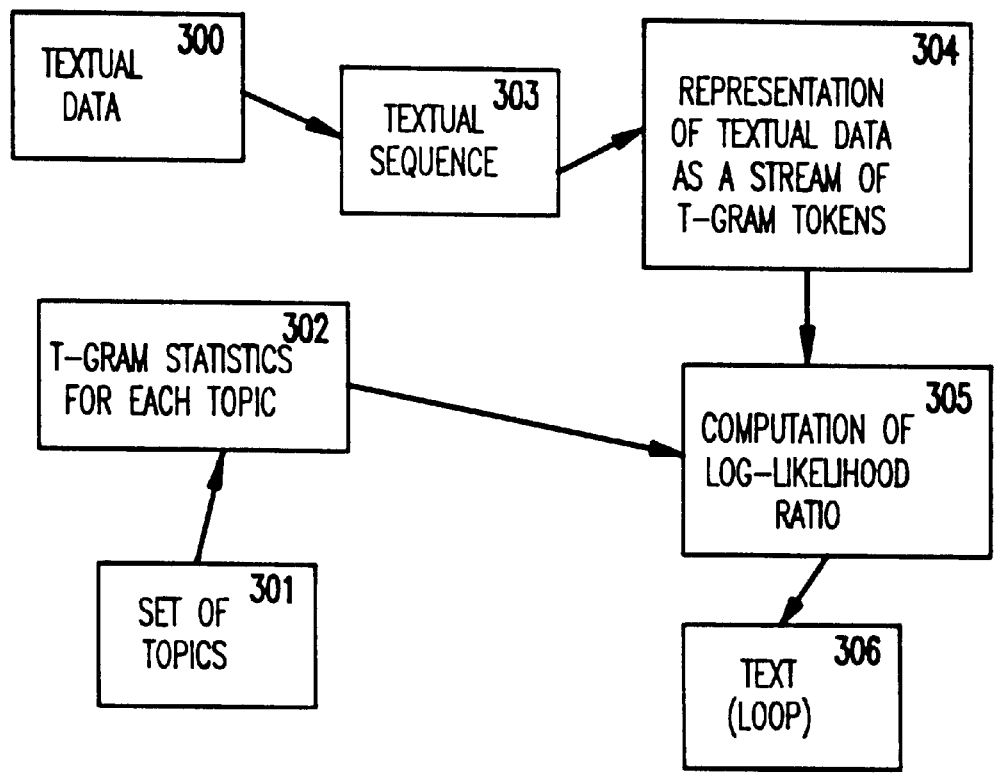
FIG. 3 is a flow chart of another one-way direction process for change-point detection via CUSUM methods based on estimate of n-gram word frequencies.

Referring now to FIG. 3, this figure is substantially similar to the flow shown in FIG. 2. However, the difference lies in the different methods of computing likelihood scores of observed strings of words given topics.

A segment of size k (e.g., textual sequence 303) is extracted from a textual data 300. In a block 304 (e.g., representation of textual data as stream of T-gram tokens) a string of words $W_1^{N+1}=w_1,w_2,\ldots,w_N, w_{N+1}$ is represented as a string of T-gram tokens $W_1, W_2, \ldots, W_N, W_{N+1}$, where $w_i=w_{i-t+1},\ldots,w_i$. The T-grams are sets of T words (e.g., 3-grams correspond to triples of words) for which distributions are assumed to be given by the language model. Tokens could include single words, 2-word tuples or n-word tuples.

In the module 302 (e.g., T-gram statistics for each topic) for each such sequence of words $w_i$, a T-gram probability score $P_W^T=\text{Prob}_T(w_i/w_{i-l},\ldots,w_{i-t+1})$ of seeing the word $w_i$ given a sequence $w_{i-1},\ldots,w_{i-t+1}$ is estimated for each topic T from the set of topics 301.

A likelihood of observing a whole string of words $W_1^{N+1}$ is computed as a product of T-gram probability scores $\Pi_{i=1}^{N+1} P_W^T$. As explained above with regard to FIG. 2, one can take a logarithm from this product and reduce a log-likelihood score to a sum of terms $\log(P_W^T)$. The log-likelihood ratio 305 is computed as a difference of sum of logarithms.

One can also use a mixture of T-gram probability scores for different t while computing a likelihood score given a string of words.

Figure 4:
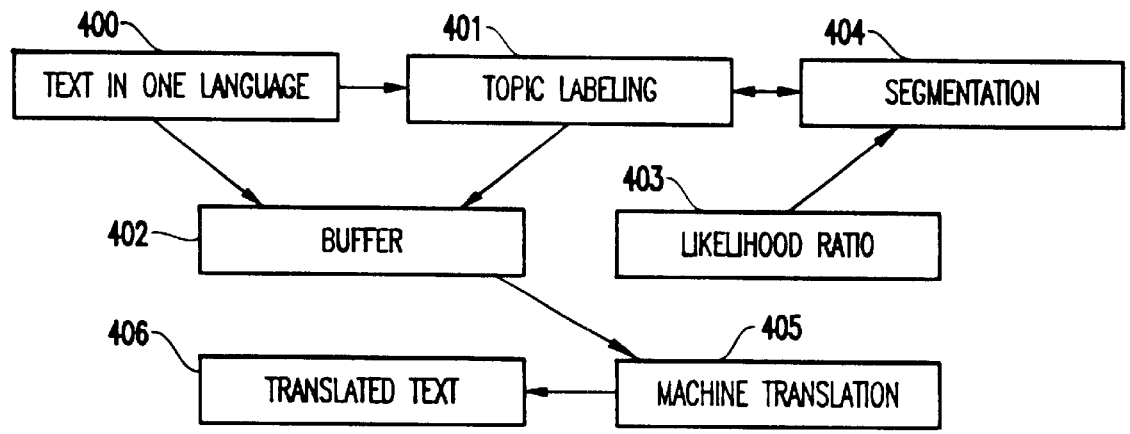
FIG. 4 is a flow chart of a two-way direction process for improving machine translation with a segmentation method.

Referring now to FIG. 4, which illustrates a flowchart of a two-way direction process for improving machine translation with a segmentation method, a block 400 contains a text that should be translated (e.g., text in one language).

This text is segmented (e.g., in block 404) with topic onsets and labeled with topics in a block 401 using likelihood ratios 403, as explained above with regard to FIG. 1A. As text data is accumulated to proceed with topic identification of a segment, the text data is stored in the buffer 402.

After a topic of the current segment is established, a text segment from the buffer 402 is sent to a machine translation module 405 for translation. The machine translation module 405 performs translation on each homogenous segment (e.g., in the context of the invention, "homogeneous" means a text segment labeled as corresponding to a single topic) using different language models that were trained for each topic. An output of the machine 405 is a translated text 406.

Figure 5:
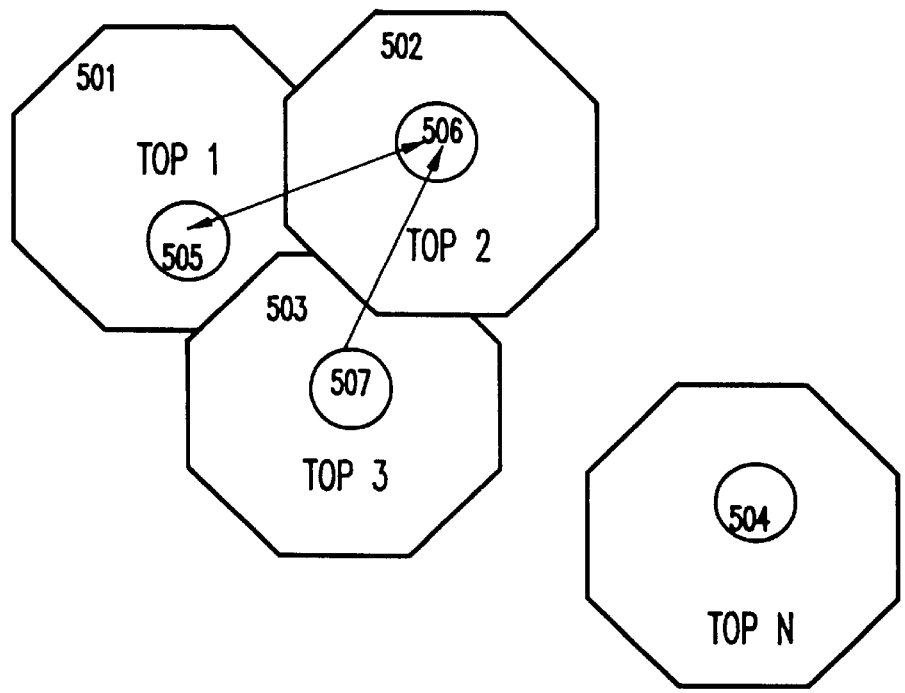
FIG. 5 illustrates a one-way direction process of separation of features belonging to different topics and topic identification via a Kullback-Liebler distance.

Referring to FIG. 5, which illustrates on one-way direction process of separating features belonging to different topics and topic identification via a Kullback-Liebler distance method, texts that are labeled with different topics are denoted as 501 (e.g., topic 1), 502 (e.g., topic 2), 503 (e.g., topic 3), 504 (e.g., topic N) etc. Textual features can be represented as frequencies of words, a combination of two words, a combination of three words etc. On these features, one can define metrics that allow computation of a distance between different features.

For example, if topics $T_i$ give rise to probabilities $P(w_t|T_i)$, where $w_t$ run all words in some vocabulary, then a distance between two topics $T_i$ and $T_j$ can be computed as $$I(T_i, T_j) = \sum_t P(w_i|T_i)\log\frac{P(w_i|T_i)}{P(w_i|T_j)} \quad (10)$$

Using Kullback-Liebler distances is consistent with likelihood ratio criteria that are considered above, for example, in Equation (6). Similar metrics could be introduced on tokens that include T-gram words or combination of tokens, as described above. Other features reflecting topics (e.g., key words) can also be used.

For every subset of k features, one can define a k dimensional vector. Then, for two different k sets, one can define a Kullback-Liebler distance using frequencies of these k sets. Using Kullback-Liebler distance, one can check which pairs of topics are sufficiently separated from each other. Topics that are close in this metric could be combined together.

For example, one can find that topics related to "LOAN" and "BANKS" are close in this metric, and therefore should be combined under a new label (e.g. "FINANCE"). Also, using these metrics, one can identify in each topic domain textual feature vectors ("balls") that are sufficiently separated from other "balls" in topic domains. These "balls" are shown in FIG. 5 as 505, 506, 504, etc. When such "balls" are identified, likelihood ratios as in FIG. 1, are computed for tokens from these "balls".

For example, one may find that singular words do not separate topics sufficiently, but that topics are separated well if features in "balls" include tokens of 3-word tuples (e.g., 3-gram tokens as explained above with regard to FIG. 3). In this case, likelihood ratios are computed as in FIG. 3 for 3-gram tokens.

Figure 6:
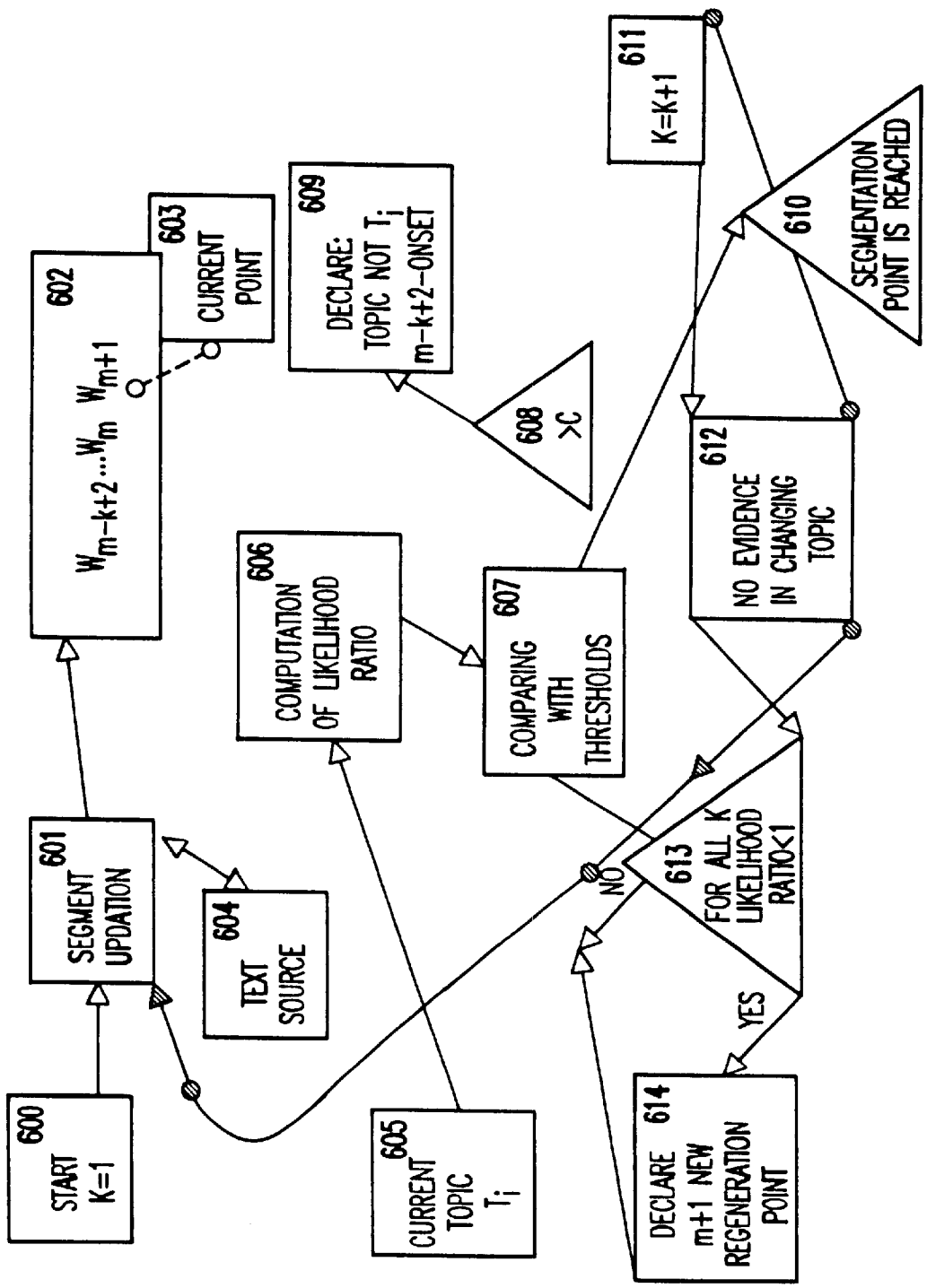
FIG. 6 is a flow chart of a one-way direction process for verification of a topic change.

Referring to FIG. 6, a flowchart is shown of a one-direction process for verification of a topic change.

In FIG. 6, once a current topic has been declared, a monitoring procedure for detection of topic change is started with a current point (e.g., module 603) that corresponds to a segment 602 of the size 1 (e.g., k=1 in a starting module 600). The procedure for verification of topic change is similar for all segment sizes and is demonstrated in FIG. 6 with a segment 602 of the size k. The likelihood ratio corresponding to a segment in 602 is computed in module 606 similar as in Equation (2) or Equation (4).

In the module 607, the likelihood ratio from 606 is compared with the threshold 608. If this threshold is exceeded, then one declares in module 609 that there is an evidence of topic change. The point m−k+2 is declared as an onset of a new topic. The exact new topic will be defined in the next step (e.g., as described with regard to FIG. 8 below).

If the threshold is not exceeded, then it is verified (e.g., in module 610) whether the regeneration point is reached (i.e., whether it is feasible to go backward beyond the point $w_{m-k+2}$ in the segment 602).

If the regeneration point is reached, then it is decided in module 612 that there is no evidence of topic change. Thereafter, it is verified in module 613 whether the regeneration point conditions of Equation (3) are fulfilled for all sub-segments $w_{m-k+2} \ldots w_{m+1}$, where k is running from 1 to its latest value when module 612 was activated.

If it was found that these conditions in Equation (3) are fulfilled for all sub-segments, a new regeneration point $w_{m+1}$ is declared.

If it was found in module 610 that the regeneration point has not yet been reached, then a value of k is increased by 1 (e.g., incremented), and a segment is increased by 1 word (e.g., going backward) in module 601 (e.g., taking words from the text 604). Then, the process continues through module 602 as described above.

Figure 7:
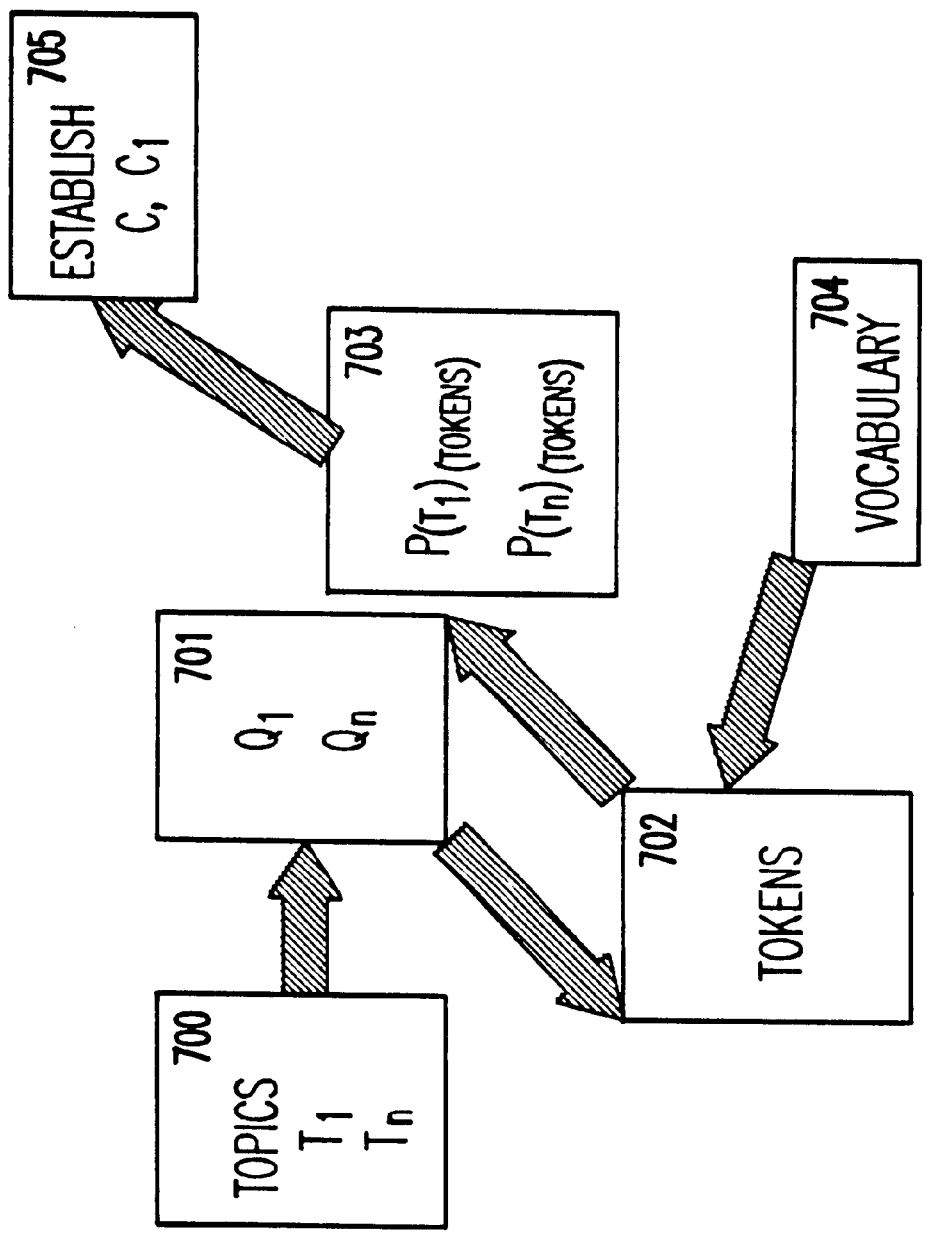
FIG. 7 is a flow chart for a one-way direction training procedure.

Referring now to FIG. 7, a flowchart is shown for a one direction training procedure. That is, in FIG. 7, a battery 700 contains n topics $T_1, \ldots, T_n$. Each topic $T_i$ is represented by a training text $Q_i$ in module 701.

In module 702, tokens from a vocabulary 704 are formed (e.g., tokens could consist of/include single words, 2n-word tuples or n-word tuples). For each training text $Q_i$, probability distributions $P_i^{(T_j)}$ of tokens 702 are estimated. These probability distributions can be obtained as frequencies of tokens in corresponding texts in module 701.

In module 703, thresholds c, $c_1$ are defined from training data. These constants c, $c_1$ are used in the "Detection of Onset of a New Topic" and "Topic Identification" sections described above.

This completes a training stage that is done in advance (e.g., before topic identification procedures).

Referring to FIG. 8, a flowchart of a one direction process for identification of a topic is shown.

That is, topic identification is performed for a segment $R_{m-k+2}^{m+1} = (w_{m-k+2}, \ldots w_{m+1})$ that was produced either when a topic change was declared, as described in FIG. 6 above, or from a preceding step of topic identification. Scores S(j) of this text segment for each topic $T_j$ are computed in 801 in accordance with Equation (5).

These scores (e.g., for each topic) are compared with c for all j in 802. If these scores exceed c for all topics, then, in module 803, it is declared that a current topic is not in the battery, and a switch is made to a "neutral" topic in the further monitoring process (and in a translation process that is described in FIG. 4 above). Otherwise, a topic $T_i$ is found that maximizes a likelihood of seeing the sample for a given topic.

If the inequality in module 806 (e.g., long regime) or module 809 (e.g., robust regime) are fulfilled, then $T_i$ is declared as the current topic in module 808. Long and robust regime formula are written down also in Equations (6) and (7)). Otherwise, a new word (e.g., module (807)) is added to the text segment 800 and the process is continued.

Figure 9:
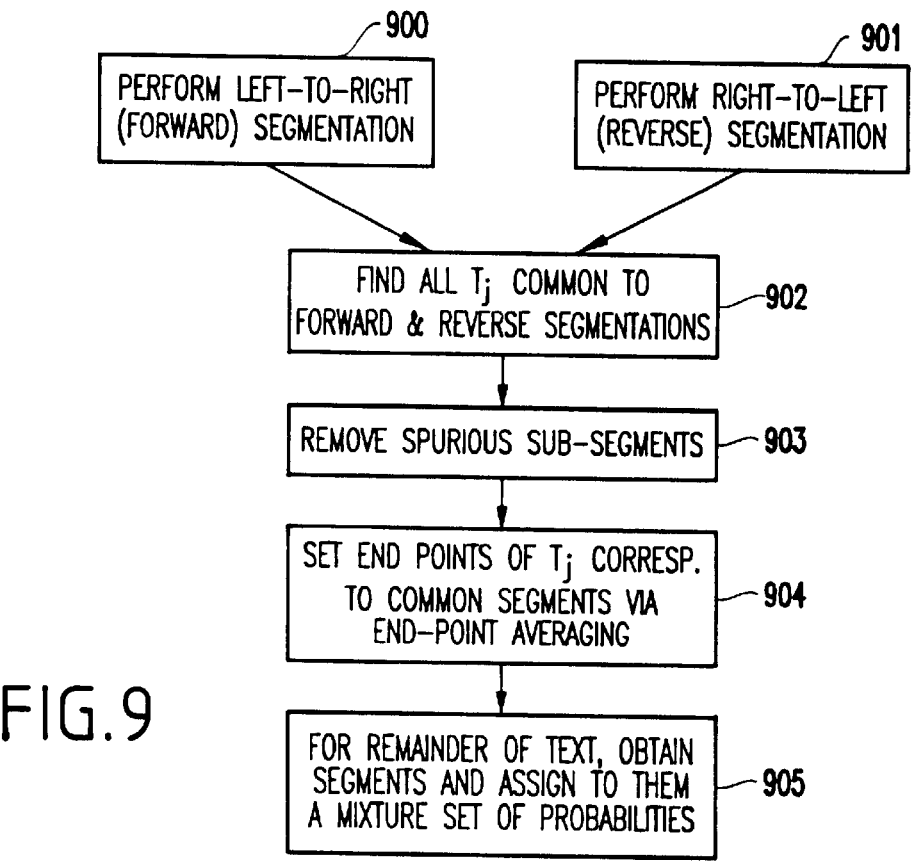
FIG. 9 is a block scheme for resolving different labelling sets from two-way directed labeling processes.

FIG. 9 illustrates a flowchart of a method for resolving different labeling sets from the forward (right-to-left) and reverse (left-to-right) segmentation.

The modules (e.g., steps) 900 and 901 perform the forward and reverse segmentations. The module 902 locates all segments (topics) on which an overlap is observed (i.e., extracts points on which results of forward and reverse segmentations agree.

Module 903 removes spurious sub-segments which occur when a topic T detected in one direction overlaps with several instances of the same topic T in the opposite direction (the intermediate sub-segments are considered spurious and are deleted. As a result of this pruning, if there is agreement on topic T between forward and reverse segmentations, then there is only one segment on which the forward segments corresponding to T intersect. Such common segments are then finalized via edge-averaging process in module 904.

Finally, module 905 goes through all segments on which there is a disagreement between forward and superimposes them on a single time axis. This module goes through every segment obtained in this way and labels them as "mixture" topics. For example, it will label a segment as ¾ "Law" and ¼ "Medical" if segmentation in one direction labeled it as "Law" and segmentation in opposite direction labelled it as "Medical", and the "Law" topic was three times longer than the "Medical".

Figure 10:
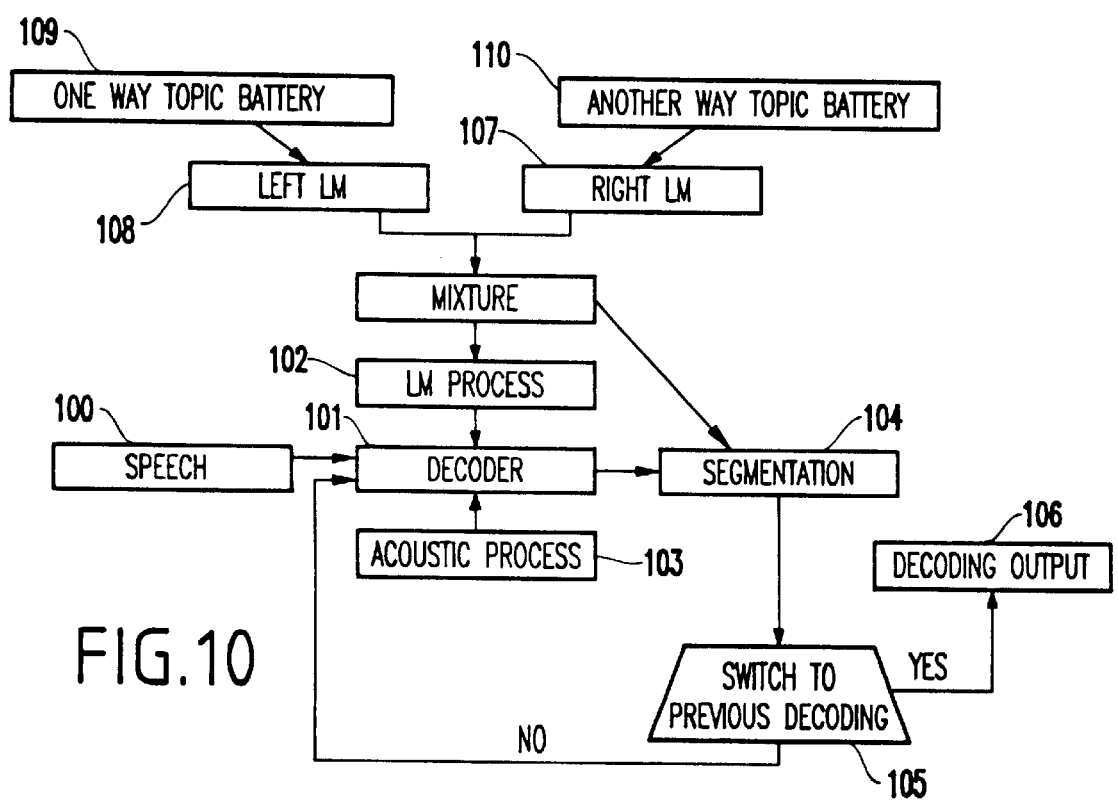
FIG. 10 is a flow chart of two-way direction process for improving automatic speech recognition (ASR)

Referring now to FIG. 10, a flowchart is shown of a two-way direction process for improving automatic speech recognition (ASR). That is, an improved automatic speech recognition procedure is shown that includes a few iterations. Speech 1100 is processed by a decoding module 1101. This decoding module uses an acoustic process 1103 in a standard way and LM process 1101.

If the decoding is performed in a first iteration, then one of the general language modules LM (e.g., left 1108) or right (e.g., 1107) is used in a standard way. Here, a "general LM" means a LM that is trained for all topics (i.e., it is neutral).

The decoding output is segmented and classified by topics using a battery of (e.g., left and right) topics 1109 and 1110 and left and right LMs 1108 and 1107 with mixtures for confusable segments, as described above. For non-confusable segments, one can use any one of LMs (e.g., left or right).

If this was a first iteration, then the decoding is repeated (e.g., in module 1103) using LM scores for each segment that correspond to a topic of this segment that was labelled in a previous iteration, or a mixture of LMs if segments are confusable. This gives an improved decoded text that is again segmented and labelled in 1104.

If the decoding output and segmentation are not similar (e.g., in module 1105) to what was obtained in a previous decoding, then the process is finished. Otherwise, the process is repeated (e.g., via module 1101). Otherwise the decoding output 1106 is produced as final.

FIG. 11 illustrates a typical hardware configuration of an information handling/computer system in accordance with the invention and which preferably has at least one processor or central processing unit (CPU) 1111.

The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139. As mentioned above, the printer 1139 may be a digital printer or the like. Further, an automated reader/scanner 1140 may be included. Such readers/scanners are commercially available from many sources.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1111 (FIG. 11), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1111 and hardware above, to perform the method of the invention.

This signal-bearing media may include, for example, a RAM contained within the CPU 1111, as represented by the fast-access storage for example. Alternatively, the instructions may be contained in another signal-bearing media, such as a magnetic data storage diskette 1200 (FIG. 12), directly or indirectly accessible by the CPU 1111.

Whether contained in the diskette 1200, the computer/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the unique and unobvious aspects of the method and system according to the present invention, the problem of detecting topical changes via application of "cumulative sum" (CUSUM)-based methods is solved. More specifically, the inventive topic identification procedure evaluates text probabilities under each topic, and then selects a new topic when one of those probabilities becomes significantly larger than the others.

Since the topic detection is done off-line, the inventive method can be enhanced with producing several different topic labeling using different labeling strategies. One of such labeling strategies marks topics moving from an end of a text to a beginning. Then, the special topic labeling is chosen via evaluation of several evidences and factors that lead to different topic labeling. This special topic labeling can be applied to produce new topic scores that are needed for improving a language model in off-line automatic speech recognition decoding or machine translation.

Thus, the present invention can perform off-time topic detection by segmentation of textual data into "homogenous" segments and topic (event) identification of a current segment using different time directions (e.g., moving from a beginning of a text to the end of it and vice versa), and estimating probability scores for topics using marks that were obtained via these different labeling procedures.

More specifically, the invention uses CUSUM-based methods for detecting change-points in textual data and estimate probabilities of sample distribution for topic identification.

Thus, the invention applies change-point detection methods for detection of "homogenous" segments of textual data while moving in two different "time" directions: from a beginning of a text to an end and vice versa. This enables identifying "hidden" regularities of textual components that are obtained for each "time" direction. If these regularities coincide for both directions, then they are used for topic labeling. Otherwise, they are used to build a mathematical model that reflects confusability in these regularities.

With the present invention, off-line segmentation of textual data that uses change-point methods is employed and off-line topic identification of textual data can be performed, such that fast (near realtime) topic detection can be achieved and such that improved language modeling for off-line automatic speech decoding and machine translation results.

While the overall methodology of the invention is described above, the invention can be embodied in any number of different types of systems and executed in any number of different ways, as would be known by one ordinarily skilled in the art. Thus, those skilled in the art will recognize that the invention can be practiced with modification within the spirit and scope of the appended claims.

What is claimed is:

1. A computer system, comprising:
   at least one central processing unit (CPU);
   at least one memory coupled to said at least one CPU;
   a network connectable to said at least one CPU; and
   a database, stored on said at least one memory, containing a plurality of textual data set of topics,
   wherein said at least one CPU executes first and second processes in forward and reverse directions, respectively, for extracting a segment having a predetermined size from a text, computing likelihood scores of a text in the segment for each topic, computing likelihood ratios based on said likelihood scores, comparing said likelihood ratios to a threshold and defining whether there is a change point at the current last word in the window.

2. The system according to claim 1, wherein said at least one CPU further executes a process for extracting a segment having a predetermined size from a text, computing likelihood ratios, comparing the likelihood ratios to a threshold, and defining a new topic, or determining that the topic is not in a battery of topics.

3. The system as in claim 1, wherein the likelihood score is computed using a T-gram language model.

4. The system as in claim 1, wherein said at least one CPU further executes a process for translating segmented text using topic labeling of each segment.

5. The system as in claim 1, wherein said at least one CPU further executes a process for labelling non-confusable segments.

6. The system as in claim 1, wherein said at least one CPU executes the process for labeling of confusable segments using a mixture of language models.

7. The method according to claim 1, wherein, with a text containing a topic T, said forward and reverse processes respectively produce corresponding segments $T^1$ and $T^2$ for said forward and reverse directions,
wherein the segment $T^1$ is biased to the right relative to T, and the segment $T^2$ is biased to the left, and wherein forward segmentation assigns the left edge of T to a preceding topic and reverse segmentation assigns the right edge of T to a preceding topic,
wherein averaging of the edges of $T^1$ and $T^2$ is performed.

8. The method according to claim 7, wherein when $T^1$ covers more than one occurrence of $T^2$ such that $T^1$ covers a sub-segment identified by a reverse search, surrounded by $T^2$ on both sides, said sub-segment is considered as part of $T^2$, and extraction of the edges of said topic by averaging edges of $T^1$ and $T^2$ is performed.

9. A method of performing off-line detection of textual topical changes and topic identification, comprising:
extracting a segment of a size one, two and more from a text;
computing likelihood scores of a text in the segment for each topic;
computing likelihood ratios based on said likelihood scores; and
comparing said likelihood ratios to a threshold and defining whether there is a change point at a current last word in a window, wherein said method is executed in forward and reverse directions.

10. The method according to claim 9, wherein said method is executed by at least one central processing unit.

11. The method according to claim 9, further comprising:
extracting a segment of size one, two and more from a text;
computing likelihood ratios based on the likelihood scores of a text in the segment for each topic;
comparing the likelihood ratios to a threshold; and
one of defining a new topic and determining that the topic is not in a battery of topics.

12. The method as in claim 9, wherein computing the likelihood score includes using a T-gram language model.

13. The method as in claim 9, further comprising:
translating segmented text using a topic labeling of each segment.

14. The method as in claim 9, further comprising:
labelling non-confusable segments.

15. The method as in claim 9, further comprising:
labelling confusable segments including using a mixture of language models.

16. A method of detecting topical changes in a textual segment, comprising:
evaluating text probabilities under each topic of a plurality of topics including segmenting textual data of said textual segment and identifying a topic of a current segment in different time direction; and
selecting a new topic when one of said text probabilities becomes larger than others of said text probabilities wherein said topic detection is performed off-line, wherein said segmenting includes segmenting said textual segment into homogenous segments and wherein said different time directions include moving from a beginning of a text to the end of said text and vice versa.

17. The method according to claim 16, further comprising labeling said topic using different labeling strategies,
wherein said labelling includes marking topics moving from an end of a text to a beginning.

18. The method according to claim 17, further comprising:
estimating probability scores for topics using marks that obtained by said labeling.

19. The method according to claim 16, wherein a cumulative sum-based method is used for detecting change-points in textual data and for estimating probabilities of sample distribution for topic identification.

20. The method according to claim 19, further comprising:
applying a change-point detection for detection of homogenous segments of textual data while moving in two different time directions, thereby to identify hidden regularities of textual components that are obtained for each time direction.

21. The method according to claim 20, wherein if said regularities coincide for both directions, then said regularities are used for topic labeling, and
wherein if said regularities do not coincide for both directions, then said regularities are used to build a mathematical model that reflect confusability in these regularities.

22. The method according to claim 16, further comprising:
performing labelling for each of a plurality of directions; and
resolving confusable decisions obtained for different directions.

23. The method according to claim 16, further comprising:
performing off-line segmentation of textual data that uses a change-point detection such that off-line topic identification of textual data can be performed.

24. The method according to claim 16, wherein said method includes utilizing a change-point detection using a cumulative sum (CUSUM) technique.

25. The method according to claim 16, further comprising:
performing a one direction topic segmentation and labeling including a training procedure.

26. The method according to claim 25, wherein said training procedure comprises:
creating a battery of topics $T_1, T_2, \ldots, T_n$, wherein each topic is characterized by one of frequencies of tokens, frequencies of combination of two words and three words, wherein a Kullback-Liebler distance between any two topics is defined as at least h, where h is a threshold, wherein probabilities of a tuple of words depend on time directions, and for each time direction, separate probabilities for a combination(s) of words are estimated;
creating a neutral topic T derived from textual data that include all topics and other general texts; and
finding typical durations of texts belonging to topics in the battery.

27. The method according to claim 26, wherein said training procedure further comprises:
examining estimated frequencies and comparing said estimated frequencies to all topics in the list, to determine a single topic as a predetermined topic and declaring said topic,
wherein if a conclusion is reached that a current topic is not in the list, then $\hat{T}$ is declared as a current topic.

28. The method according to claim 27, wherein said training procedure further comprises:
once a topic $\hat{T}$ has been declared, monitoring to detect a change in said topic,
wherein during monitoring a likelihood of text is compared against $\hat{T}$ until a regeneration point is reached.

29. The method according to claim 28, wherein said training procedure further comprises:
  establishing a current topic including, once the topic change is detected, establishing a time of onset of the new topic;
  without declaring a new topic, continuing to accumulate words until a topic having a predetermined high score is found, said continuing including:
    finding a candidate topic $T_i$ for which the likelihood of the text is maximal, and then finding the closest competing topic representing a topic that has the maximum of likelihoods corresponding to remaining topics excluding $\tilde{T}$;
    comparing a likelihood of the group of words in the candidate topic $T_i$ against $\{T_1, \ldots \}$, and if the likelihood is higher by a given factor than the likelihood of a text to the closest competing topic, then $T_i$ is declared as the current topic, and
    wherein if a conclusion is reached that a topic is not in the list, then $\tilde{T}$ is declared as the current topic.

30. The method according to claim 29, wherein said training procedure further comprises:
  restarting monitoring the current topic to detect a change.

31. The method according to claim 29, wherein with topic $T_j$ be declared and an onset time thereof found, a new word is taken and k is set to 1 and, starting from a current word $w_{m+1}$, go k words back and find probabilities $P_{m+1-i}^{(Tj)} = P(w_{m+1-i}|Tj), i=0,1,\ldots,k-1$, and a distribution $\{\hat{P}_{m-k+2},\ldots \hat{P}_{m+1}\}$ is constructed where $$\hat{P}_i = \frac{\text{\# of times word } i \text{ appeared in the current segment of size } k}{k}.$$

32. The method according to claim 27, further comprising:
  identifying a topic of a given text segment $w_l, \ldots, w_{m-1}$.

33. The method according to claim 32, wherein said identifying includes:
  verifying whether said segment is covered by a new topic that is not in the battery of topics,
  wherein if it is determined that the segment is covered by some topic from the battery, then said topic is identified.

34. The method according to claim 33, wherein said testing whether said topic is in the battery comprises:
  for a given k corresponding to the segment associated with the current topic, computing for every j in the battery $$S(j) = \sum_{i=0}^{k-1} \ln \frac{\hat{P}_{m-i+1}}{P_{m-i+1}^{(Tj)}}$$

wherein if $S(j)>c$ for all j, then said topic is declared as not being in the battery and a switch is performed to the neutral topic $\tilde{T}$.

35. The method according to claim 34, wherein said topic identification further comprises:
  establishing the topic by one of:
    determining if $$\frac{P(w_{m-k+2} \ldots w_{m+1}|T_i)}{\max_{j \neq i} P(w_l \ldots w_{m+1}|T_j)} > c_1$$

for some i, and if so, then $T_i$ is declared as a new topic; and
    determining if $$\frac{P(w_l \ldots w_{m+1}|T_i)}{\max_{j \neq i} P(w_l \ldots w_{m+1}|T_j)} > c_1$$

for some i and $l=m+1, m, \ldots, m-k+2$, and if so, then $T_i$ is declared as a new topic.

36. The method according to claim 35, wherein if it was neither established that the topic is not in the battery nor that the topic was identified, an additional point is taken by incrementing m, and it is retested of whether said topic is in the battery.

37. The method according to claim 27, further comprising:
  resolving different labeling sets performed in different labelling procedures.

38. The method according to claim 37, wherein said resolving includes:
  checking said labels which were obtained through different time directions, wherein if some labels from different time directions coincide and are located closely in a predetermined manner, then this label is chosen and is placed in a middle of a location of labels from two directions.

39. The method according to claim 37, wherein a sum is constructed of:

$$S_k = \sum_{i=0}^{k-1} \ln \frac{\hat{P}_{m-i+1}}{P_{m-i+1}^{(Tj)}}$$

wherein if $S_k>c$, then a change in topic is determined to have occurred and m−k+2 is declared as the onset point, and
  wherein if $S_k>c$ is not determined, then k is incremented and the process is repeated.

40. The method according to claim 39, wherein if the regeneration point is reached and $S_k>c$ is not determined, then the current topic $T_j$ is continued, and
  wherein if for a present point $S_k<0$ for every k, then the present point is determined as a new regeneration point.

41. The method according to claim 25, wherein in said labeling, when a label in one direction $T_j^1$ divides a segment of words between two labels from a different direction $T_{i1}^2$ and $T_{i2}^2$ and with the label $T_j^1$ different from labels $T_{i1}^2$ and $T_{i2}^2$, first and second topic labels are introduced,
  wherein said first label includes a label $T_{j,i1}^{1,2}$ for a segment $S_{1,1}$ that is covered by both $T_j^1$ and $T_{i1}^2$, and said second label includes a label $T_{j,i2}^{1,2}$ for a segment $S_{1,2}$ that is covered by both $T_j^1$ and $T_{i2}^2$.

42. The method according to claim 41, wherein, for each of said first and second labels and a new segment that is covered by said first and second labels, a new set of probabilities is attached including a mixture of previous probability sets that are related to previous topics, such that letting $P_a = P(w_k \ldots w_r|T_j^1)$ be a probability for a string of words in the segment $S_{1,1}$ labelled by a topic $T_j^1$ and $P_b = P(w_k \ldots w_r|T_i^1)$ be a probability for said string of words labelled by a topic $T_i^1$, a new probability is defined for said string of words as $P_{ab} = P(w_k \ldots w_r|T_{j,i1}^{1,2}) = \alpha P_a + \beta P_b$,
  wherein $\alpha = l_1/l$ and $\beta = l_2/l$, where $l_1$ is a duration of a sub-segment $S_{1,1}$, $l_2$ is a duration of a sub-segment $S_{1,2}$ and $l = l_1 + l_2$.

43. The method according to claim 16, further comprising detecting an onset of a new topic; and
  wherein with P(wl, wl+1, . . . wr|Tl) representing a likelihood measure for identifying a given string of words wl, wl+1, ... wr in a context of a topic Ti from a battery, and with Fi(wl, wl+1, ... wr)–max {j=1 ... n, Tj≠Ti; Tj≠T}P(w; ... wr|Tj) and that a moment of time 1 corresponds to a regeneration point and having analyzed words from wl to wm and found no evidence that the declared topic Ti changed, determining whether the next word Wm+1 belongs to the same topic or that the topic has changed.

44. The method according to claim 43, wherein said verification includes:

taking a segment of length 1, and determining whether $$\frac{F_i(w_{m+1})}{P(w_{m+1}|T_i)} > c.$$

45. The method according to claim 44, wherein if it is determined that $$\frac{F_i(w_{m+1})}{P(w_{m+1}|T_i)} > c,$$

then it is declared that topic is not $T_i$, and m+1 is declared as the onset point of a new topic.

46. The method according to claim 45, wherein if it is determined $$\frac{F_i(w_{m+1})}{P(w_{m+1}|T_i)} \text{ is } \leq c,$$

then a segment of length 2 is taken and it is determined whether $$\frac{F_i(w_m, w_{m+1})}{P(w_m, w_{m+1}|T_i)} > c.$$

47. The method according to claim 46, wherein if it determined that $$\frac{F_i(w_m, w_{m+1})}{P(w_m, w_{m+1}|T_i)} > c,$$

then said topic is declared as not $T_i$, and m is declared as the onset point of a new topic.

48. The method according to claim 47, wherein if it is determined that $$\frac{F_i(w_m, w_{m+1})}{P(w_m, w_{m+1}|T_i)} \leq c,$$

then a segment of length 3 is taken and it is determined whether $$\frac{F_i(w_{m-1}, w_m, w_{m+1})}{P(w_{m-1}, w_m, w_{m+1}|T_i)} > c.$$

49. The method according to claim 48, further comprising determining whether a segment going back in time until the regeneration point was found for which:

$$\frac{F_i(w_{m+2-k} \ldots w_{m-1}, w_m, w_{m+1})}{P(w_{m+2-k} \ldots w_{m-1}, w_m, w_{m+1}|T_i)} > c.$$

50. The method according to claim 49, wherein if it is determined that $$\frac{F_i(w_{m+2-k} \ldots w_{m-1}, w_m, w_{m+1})}{P(w_{m+2-k} \ldots w_{m-1}, w_m, w_{m+1}|T_i)} > c,$$

then it is declared that the topic is not $T_i$, and m−k+2 is declared as the onset point of a new topic, and wherein if it is determined that $$\frac{F_i(w_{m+2-k} \ldots w_{m-1}, w_m, w_{m+1})}{P(w_{m+2-k} \ldots w_{m-1}, w_m, w_{m+1}|T_i)} \leq c,$$

then it is declared that there is no evidence in change of topic.

51. The method according to claim 50, wherein if 1 is reached and in all the previous steps, including a regeneration point $$\frac{F_i(w_{m+2-k} \ldots w_{m-1}, w_m, w_{m+1})}{P(w_{m+2-k} \ldots w_{m-1}, w_m, w_{m+1}|T_i)} < 1$$

then $w_{m+1}$ is declared as a new regeneration point.

52. A method for detection of textual topical changes and topic identification, comprising:
   forming a battery of topics from training data;
   detecting topic changes in said text, using said battery and a first threshold ratio;
   identifying topics in said text, using said battery and a second threshold ratio, and performing said identification using different time direction;
   segmenting textual data into homogenous segments,
   wherein said topic identification is performed off-line, and wherein text probabilities under each topic are evaluated, and a new topic is selected when one of said probabilities become larger than other probabilities, and
   wherein said different time directions include moving from a beginning of a text to the end of said text and vice versa.

53. A signal-bearing medium tangibly embodying a program of machine-readable instructions executable by a digital processing apparatus to perform a method for computer-implemented off-line detection of textual topical changes and topic identification, said method comprising:
   extracting a segment of a predetermined size from a text;
   computing likelihood scores of a text in the segment for each topic;
   computing likelihood ratios;
   comparing said likelihood ratios to a threshold and defining whether there is a change point at a current last word in a window; and
   repeating said method in a reverse time direction, wherein said method of extracting, computing and comparing is first performed in a forward direction.

* * * * *

UNITED STATES PATENT AND TRADEMARK OFFICE
CERTIFICATE OF CORRECTION

PATENT NO.        : 6,529,902 B1
APPLICATION NO.   : 09/435995
DATED             : March 4, 2003
INVENTOR(S)       : Dimitri Kanevsky and Emmanuel Yashchin Page 1 of 1

It is certified that error appears in the above-identified patent and that said Letters Patent is hereby corrected as shown below:

Please correct the spelling of the second inventor's last name from Yashchm to:

Yashch<u>in</u>

Signed and Sealed this

First Day of July, 2008

JON W. DUDAS
*Director of the United States Patent and Trademark Office*